J. L. JOSSART.
SPIKE.
APPLICATION FILED DEC. 21, 1910.
Reissued Feb. 14, 1911.
13,204.
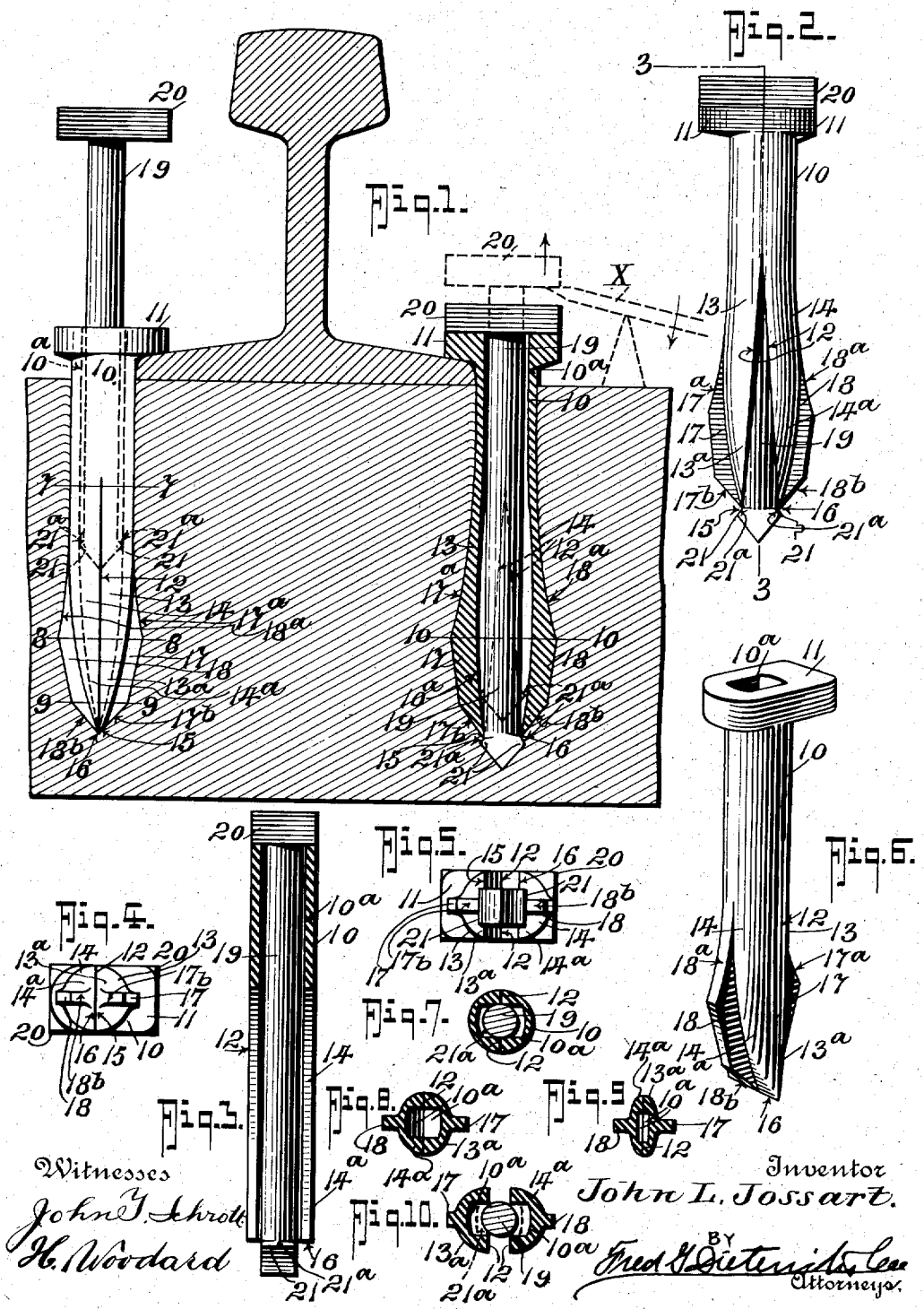
Witnesses
John T. Schrott
H. Woodard
Inventor
John L. Jossart.
BY
Fred G. Dieterich & Co.
Attorneys.

UNITED STATES PATENT OFFICE.

JOHN L. JOSSART, OF MINOCQUA, WISCONSIN.

SPIKE.

13,204. Specification of Reissued Letters Patent. Reissued Feb. 14, 1911.

Original No. 974,391, dated November 1, 1910, Serial No. 558,160. Application for reissue filed December 21, 1910. Serial No. 598,664.

*To all whom it may concern:*

Be it known that I, JOHN L. JOSSART, a citizen of the United States, residing at Minocqua, in the county of Oneida, State of Wisconsin, have invented certain new and useful Improvements in Spikes; and I do hereby declare the following to be a full, clear, and exact description of the invention, such as will enable others skilled in the art to which it appertains to make and use the same.

This invention relates to spikes and particularly to that class of spikes which are utilized to secure rails to ties.

The object of the invention resides in constructing a spike which when inserted in a tie will spread at its lower end and thus firmly clench the spike in the tie against removal from the latter while the spreading element is in place.

Another object of the invention is to provide a split or bifurcated spike employing a spreading element which will be securely locked or held in position against removal under ordinary conditions, but which may be withdrawn from the spike proper by force when desired.

A further object of the invention resides in providing a spike of the character named which will be simple in construction, efficient in use and comparatively inexpensive to manufacture.

With the above and other objects in view the invention consists in the details of construction and in the arrangement and combination of parts to be hereinafter more fully described and more particularly pointed out in the appended claims.

In describing the invention in detail reference will be had to the accompanying drawings, wherein like characters of reference denote corresponding parts in the several views, and in which:—

Figure 1, is a longitudinal section of a fragment of a rail tie showing a rail secured thereto by means of spikes constructed in accordance with the invention, one of said spikes being shown in elevation with its spreading pin being inserted, the other spike being shown in vertical section with the separating pin shown in elevation and in its locked position. Fig. 2, is an elevation of a spike constructed in accordance with the invention. Fig. 3, is a section on the line 3—3 of Fig. 2, the spreading pin being shown in elevation. Fig. 4, is an inverted plan view of the spike before separation. Fig. 5, is an inverted plan view of the spike shown in Fig. 2. Fig. 6, is a detail perspective view of the spike before separation. Figs. 7, 8, 9 and 10, are cross sections on the lines 7—7, 8—8, 9—9 and 10—10 respectively of Fig. 1.

Referring to the drawings the spike is shown as comprising a tubular member 10 having a flanged upper end 11 and its lower end longitudinally bifurcated as at 12 to form the tongues 13 and 14. The bore $10^a$ of the member 10 extends from the top of the member toward the bottom thereof, a portion of said bore extending into the inner side of each of the tongues 13 and 14; the bore $10^a$ decreases in cross sectional area as it approaches the bottom or penetrating end of the spike, or in other words, the bore $10^a$ tapers toward the lower or penetrating end of the spike, as shown in dotted lines in the left hand spike illustrated in Fig. 1 of the drawings. The outer sides of said tongues 13 and 14 taper downwardly respectively as at $13^a$—$14^a$ toward the lower end of the tubular member whereby said tongues are caused to terminate in cutting or penetrating edges 15 and 16 respectively. From the construction so far described it will be apparent that when the tubular member 10 is driven into a tie the tapering outer sides $13^a$—$14^a$ of the tongues 13 and 14 respectively will cause said tongues to be forced inwardly toward each other to hold the cutting edges 15 and 16 from spreading apart, while passing through the tie. Formed on the outer sides of the tongues 13 and 14 are laterally extending ribs 17 and 18 respectively, such ribs having their upper ends tapering inwardly as at $17^a$—$18^a$ respectively toward the upper end of the tubular member, while the lower ends of said ribs are tapered inwardly as at $17^b$—$18^b$ respectively toward the lower end of said tubular member.

Adapted for insertion in the bore $10^a$ of the member 10 is a spreading pin 19 which has its upper end flanged or headed as at 20 and its lower end provided with lateral projections 21 adapted to engage beneath the ends of the tongues 13 and 14 when said extensions have passed said tongue ends. The upper surfaces $21^a$ of the projections 21 are beveled upwardly to permit the withdrawal of the pin 10 by applying an upward force to the pin in any desired way, as for example, by forcing a wedge lever X (see dotted lines Fig. 1) between the head flanges 11 and 20 respectively.

In use the tubular member 10 is inserted in the tie with its flanged upper end 11 overlying the rail base. The spreading pin 19 is then driven through the bore $10^a$ of the member 10 (see left hand pin, Fig. 1 of the drawings), thereby causing the tongues 13 and 14 together with the ribs 17 and 18 to be forced downwardly and thus clench the spike in the tie against removal. The clenching of the spike in the tie is further enhanced by the inwardly tapering upper portions $17^a$—$18^a$ respectively of the ribs 17 and 18 respectively which, as will be apparent, would resist any effort to withdraw the spike particularly when the pin 19 is in place, by reason of the wedging coaction between the tapering portion $17^a$—$18^a$ of the ribs, and the tie. The spreading pin 19 is held against removal, under ordinary conditions, from the tubular member by engagement of the projections 21 with the lower ends of the tongues 13 and 14.

What I claim is:

1. The combination with a tubular member provided with a flanged upper end and having its lower end formed of a plurality of tongues, the outer side of each of said tongues tapering inwardly continuously toward the lower end of the member, a rib on the outer side of each tongue and disposed longitudinally to the latter, the upper and lower ends of each of said ribs tapering inwardly toward the top and bottom of said member respectively, and a spreading pin adapted to force said tongues outwardly as the pin is driven into the bore of the tubular member.

2. In a spike, the combination with a tubular member having its lower end slit to form a plurality of tongues, the outer side of each of said tongues tapering inwardly toward the lower or penetrating end of said member, longitudinal ribs on the outside of said tongues, said tubular member having a bore extending from end to end, and a spreading pin adapted to enter said bore to force said tongues outwardly as said pin is driven into said bore of said tubular member, said pin being of a greater length than said tubular member and terminating at its lower end in a penetrating portion provided with lateral projections, the upper surfaces of which are upwardly beveled toward the body of said pin, said bevel surfaces joining the body of said pin adjacent to said penetrating ends of said tongues when said spreading pin is in place.

3. In combination with a tubular slitted spike including separable tongues, said spike having a bore extending from its upper end toward its lower or penetrating end, said bore tapering toward and terminating at said penetrating end, a spreading pin having a wedge shaped end to enter said bore to spread said tongues apart, said spreading pin wedge end including lateral projections to form stops against which the penetrating ends of said spike tongues engage to lock said pin in said bore, said pin having a head to rest on said spike head, the upper surface of said laterally projected portions of said pin being beveled to permit withdrawal of said pin by applied force in a direction to separate said pin and spike heads.

4. In a spike, a tubular spike member having a bore extending from its upper end toward its penetrating end, said bore tapering toward and terminating at said penetrating end, said tubular member having a flange or head at its upper end, said tubular member being longitudinally slitted to form a pair of opposite separable tongues, combined with a spreading pin insertible in said bore of said tubular member, said spreading pin having a head at one end to contact said tubular member head to limit the movement of said spreading pin in one direction, said spreading pin having a spreader end opposite said head and provided with lateral projections to pass through said tubular member and removably interlock said spreading pin with said tubular member to prevent movement of said spreading pin out of said tubular member under ordinary conditions.

JOHN L. JOSSART.

Witnesses:
H. T. Ames,
George Reed.